2,140,765

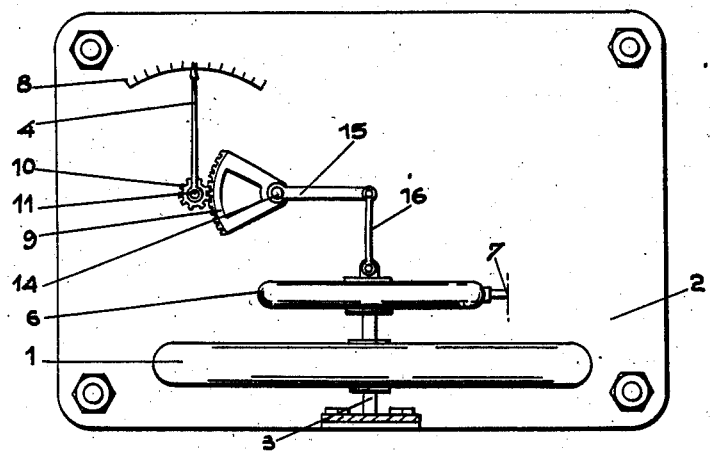
Fig. 1.
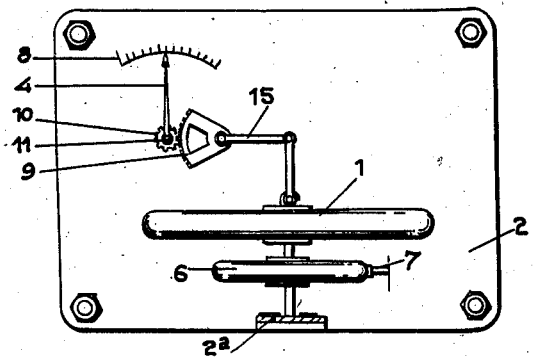
Fig. 3.
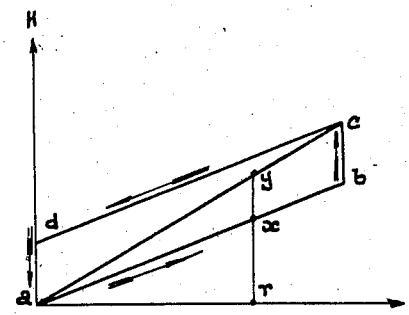
Fig. 6.
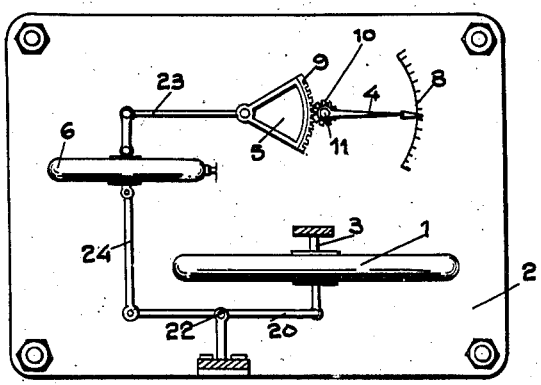
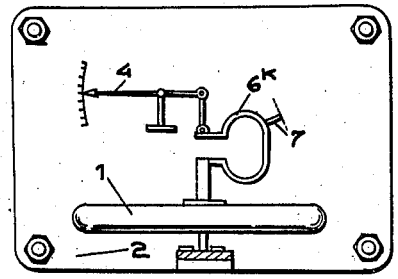
INVENTOR:
JEAN-LÉON REUTTER
BY Haseltine, Lake & Co.
ATTORNEYS Dec. 20, 1938.   JEAN-LÉON REUTTER   2,140,765
HYSTERESIS COMPENSATED PRESSURE MEASURING DEVICE
Filed March 30, 1937   2 Sheets-Sheet 2
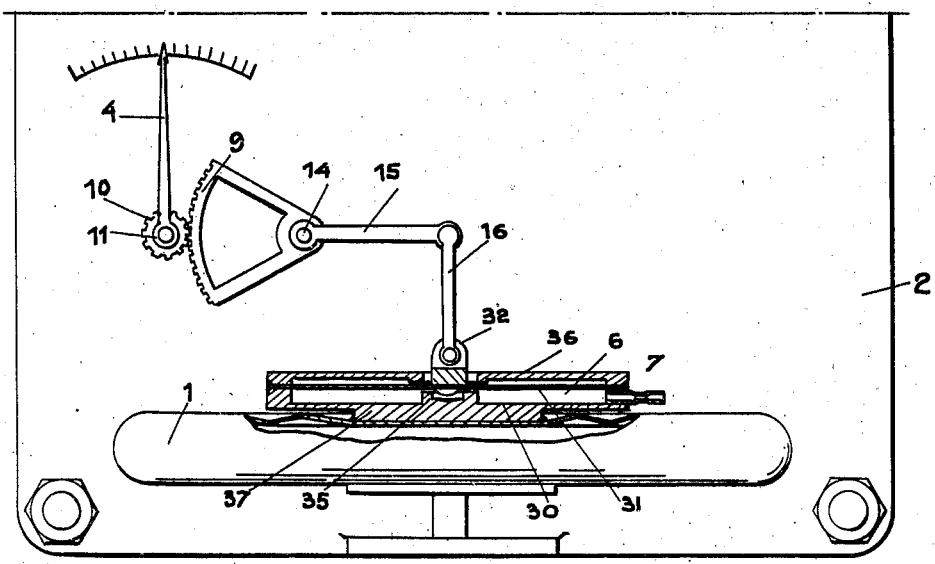
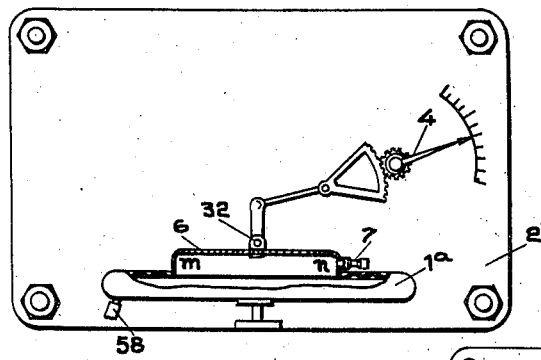
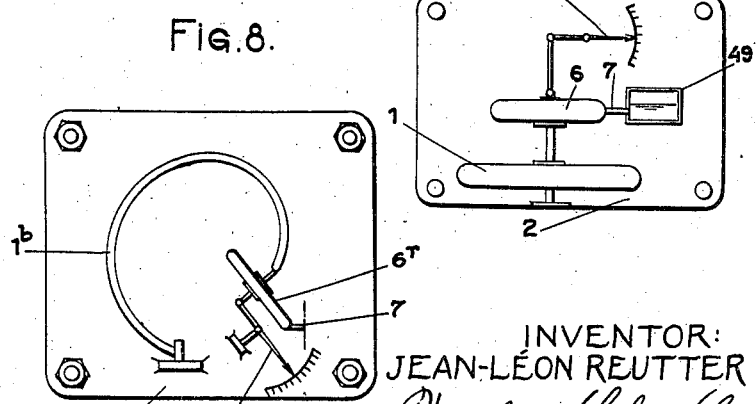
INVENTOR:
JEAN-LÉON REUTTER
BY Haseltine Lake & Co.
ATTORNEYS Patented Dec. 20, 1938

UNITED STATES PATENT OFFICE 2,140,765

HYSTERESIS COMPENSATED PRESSURE MEASURING DEVICE

Jean-Léon Reutter, Paris, France, assignor to Société Anonyme : Etablissements Ed. Jaeger, Levallois-Perret (Seine), France Application March 30, 1937, Serial No. 133,775
In France April 14, 1936

5 Claims. (Cl. 73—4)

The invention relates to a hysteresis compensated pressure measuring device.

In all apparatus for measuring or recording pressure, and particularly in pressure gauges, altimeters and recording barometers based on the variation or the distortion of the volume of a body responsive to the physical characteristics of a medium, the curves of the increasing and decreasing pressures do not coincide for two main reasons:

1. The resilient distortion always has a certain time lag on the cause which produces it (hysteresis).

2. The energy necessary for actuating the various members and mechanisms of the apparatus, and which is supplied in particular by the variation of the volume of the body responsive to the physical characteristics of a medium, further increases the time lag due to hysteresis.

It is particularly noticed that, when the cause to be measured ceases to act, the indicating means (for instance) of the apparatus very slowly return towards their initial positions.

The invention consists in automatically correcting at every instant the time lags which occur.

The main object of the invention is to provide a measuring instrument comprising: a support, a receiving device movable in this support, and a driving device producing stresses corresponding to the variations of one of the physical factors of a medium, means for transmitting the driving stresses to the support and to the movable receiving device, said means comprising a fluid chamber having at least one resiliently movable wall and an orifice checking the circulation of said fluid.

In an embodiment, the invention is characterized by the combination with an apparatus comprising in particular at least one main body distortable or expansible in function of the physical characteristics of a medium, of at least one enclosure having distortable walls, included in the movement-transmitting mechanism of the apparatus and in which a fluid is stored, this enclosure communicating, through the medium of a pipe line having a calibrated outflow section for obtaining a checking action of a definite value, with a reservoir which can be constituted by the atmosphere.

For the application of the invention, in particular to an altimeter the indicating means of which are moved by a movable unit having a high motion amplifying movement and controlled by a manometric box, between said manometric box and its support, or between the manometric box and the indicating means, is interposed an additional correcting manometric box opening to the exterior through a calibrated outflow pipe line.

The invention further relates to other embodiments, according to the types of apparatus, and some of which are described hereinafter with reference to the accompanying drawings, given by way of example only, in which:

Fig. 1 is a general diagrammatic elevation of a first form of construction of an altimeter equipped, according to the invention, with an automatic hysteresis corrector.

Fig. 2 is an explanatory diagram.

Figs. 3 and 4 diagrammatically illustrate modifications in the fitting up of the corrector comparatively to Fig. 1.

Fig. 5 is a general elevation, with partial section, of a form of construction according to the invention.

Figs. 6, 7 and 8 are diagrammatic elevations of constructional modifications.

Fig. 9 is an elevation, with partial section, of another embodiment.

The altimeter, illustrated in Fig. 1, comprises a manometric box 1 connected to a support 2 by a rod 3. This manometric box controls an index 4, through the medium of a gearing up system with interposition of an enclosure or of an additional correcting box 6 communicating with the exterior through a small channel 7 having a suitable outflow section adapted to check this outflow. The index 4 is journalled on the support 2 and it moves opposite graduations 8, the gearing up system comprising a toothed segment 9 and a toothed wheel 10. The toothed wheel 10 is rigidly secured on the shaft 11 of the index 4 and the toothed segment 9 is rigidly secured on a shaft 14 journalled on the support 2. The shaft 14 is caused to rotate by a lever 15 connected to the box 6 through the medium of a link 16.

The additional enclosure 6 not being taken into account, the operation of the apparatus gives (Fig. 2) an ascending curve cbc and a descending curve cda displaced or offset relatively to the ideal curve ac. The portions bc and da are effected in a greater or less period of time.

By taking the additional correcting enclosure 6 into consideration, the ascending and descending curves are mingled and coincide with the exact curve ac. In fact, in proportion as the airplane equipped with the improved altimeter rises, the additional enclosure or box 6 is distorted under the thrust of the air it contains and its distortions are added to those of the manometric box 1. The pressures P being indicated in abscissae and the heights in ordinates for a pressure $p$, the distortion of the enclosure or box 6 is expressed by $xy$, so that the ascending curve mingles at every instant with the exact curve $ac$. As the additional enclosure or box 6 has a leak 7, the air it contains escapes therefrom and this correction $x—y$ or $b—c$ at the end of the displacement, disappears precisely in a period of time adjustable through the leak 7 and equal to that required by the manometric box 1 for covering, as indicated above, the portion $b—c$ of the curve.

The same reasoning can be made by starting from point $c$ by considering the portion $d—a$ of the curve, the air then enters the additional enclosure or box 6 instead of issuing therefrom as previously, and the descending curve mingles with the exact curve $c—a$.

Fig. 3 is a modification of the fitting up of the additional enclosure or box 6 which is inserted in the motion amplifying unit between a lever 20 pivoted at 22 and a bent arm 23, a link 24 connecting the lever 20 and the enclosure or box.

In the example shown in Fig. 4, the additional enclosure or box 6 is interposed between a lug 2a of the support 2 and the manometric box 1.

Fig. 5 illustrates an industrial embodiment in which the additional enclosure or box 6 is constituted by a rigid bowl 30 on the edges of which is welded a resiliently distortable diaphragm 31 carrying a fork piece 32. The leakage, taking place through a tube 7, is controlled by suitable flattening of this tube.

The distortions of the diaphragm 31 are limited in both directions by an inner abutment 35 and an outer plate 36 axially perforated for the passage of the fork piece 32.

The projecting bottom 37 of the bowl is welded, in this embodiment, on the distortable diaphragm of the manometric box 1.

In the example of Fig. 6, the correcting enclosure $6k$, provided with a leak 7, is in the shape of a tube in the form of a C.

The invention is also applicable to pressure gauges adapted to measure pressures higher than atmospheric pressure. In this case, as illustrated in particular in Fig. 9, the box $1^a$ is internally subjected, through the pipe line 58 to the pressure P to be measured. The pressure P distorts the common surface $m—n$ of contact between the manometric box $1^a$ and the additional correcting manometric box 6, this having for effect to compress the fluid contained in the additional box 6 and to produce a distortion of the latter for a limited period of time determined by the leak 7.

In all cases, the correcting box 6 can be assumed to be filled with a fluid other than air, a liquid for instance. The leak or checking tube 7 will then open in a tank 49 containing a reserve of said fluid (Fig. 7).

As particularly illustrated in Fig. 8, variable receptacles $1^b$ and $6^r$ of various shapes can be associated. This Figure 8 shows an embodiment in which a curved tube $1^b$ is corrected by a box $6^r$ provided with a leak 7.

It is obvious that the embodiments described and illustrated are given herein by way of indication only and not in a limiting sense. All changes or modifications which do not alter in any way the main features above set forth and the desired result, remain included in the scope of the present invention.

What I claim as my invention and desire to secure by Letters Patent is:

1. In a measuring apparatus, in combination: a fixed support, a movable member responsive to the variable to be measured and taking a bearing on said support, a box containing fluid having at least one movable wall and an orifice for checking the flow of said fluid to and from said box, means for coupling said movable member to said movable wall and indicating means adapted to obey the resulting movement of said movable wall and member.

2. In a measuring apparatus, in combination: a fixed support, a movable member responsive to the variable to be measured and taking a bearing on said support, a box containing fluid having resiliently distortable and movable walls, said box being provided with an orifice for checking the flow of said fluid to and from said box, means for coupling said movable member to said box and indicating means adapted to obey the resulting movement of said movable walls and member.

3. In a measuring apparatus, in combination: a fixed support, a fluid-tight manometric box having resiliently distortable and movable walls, a box containing fluid having resiliently distortable and movable walls, said box being provided with a calibrated pipe line for checking the flow of said fluid to and from said box, means for coupling said manometric box to said box containing fluid and indicating means adapted to obey the resulting movement of said movable walls of the boxes.

4. In a measuring apparatus constituted by an altimeter and as claimed in claim 3, the box containing fluid provided with a calibrated pipe line for checking the flow of said fluid to and from said box is constituted by the combination: of a rigid bowl, a resiliently distortable wall secured in a fluid-tight manner on the edge of said bowl, an axially perforated cap secured to the periphery of said resiliently distortable wall for constituting an abutment limiting the distortion of said wall in one direction, the bottom of said bowl being so shaped as to constitute a projection in view of providing an abutment limiting the distortion of said wall in the other direction.

5. In a measuring apparatus, in combination: a fixed support, a first chamber containing fluid having resiliently distortable and movable walls responsive to the variable to be measured, said chamber taking a bearing on said support, a second chamber containing fluid having at least one movable wall and a wall common to said first chamber, said second chamber moreover including an orifice for checking the flow of said fluid and indicating means adapted to obey the resulting movement of said movable walls of said chambers.

JEAN-LÉON REUTTER.